(12) United States Patent
Schmid et al.

(10) Patent No.: US 11,491,564 B2
(45) Date of Patent: Nov. 8, 2022

(54) POWER TOOL, SYSTEM, AND METHOD

(71) Applicant: FESTOOL GMBH, Wendlingen (DE)

(72) Inventors: Markus Schmid, Wendlingen am Neckar (DE); Marc Rusch, Esslingen am Neckar (DE)

(73) Assignee: FESTOOL GMBH, Wendlingen (DE)

( * ) Notice: Subject to any disclaimer, the term of this patent is extended or adjusted under 35 U.S.C. 154(b) by 55 days.

(21) Appl. No.: 16/632,991

(22) PCT Filed: Jul. 24, 2017

(86) PCT No.: PCT/EP2017/068648
§ 371 (c)(1),
(2) Date: Jan. 22, 2020

(87) PCT Pub. No.: WO2019/020164
PCT Pub. Date: Jan. 31, 2019

(65) Prior Publication Data
US 2021/0154758 A1 May 27, 2021

(51) Int. Cl.
*B23D 45/16* (2006.01)
*B23D 59/00* (2006.01)
*B27G 19/04* (2006.01)

(52) U.S. Cl.
CPC ............ *B23D 59/001* (2013.01); *B23D 45/16* (2013.01); *B27G 19/04* (2013.01)

(58) Field of Classification Search
CPC ...... B23D 59/001; B23D 45/16; B27G 19/04; B27G 19/02; B25F 5/00; H04L 67/12
(Continued)

(56) References Cited

U.S. PATENT DOCUMENTS 3,923,126 A 12/1975 Bidanset
7,055,417 B1 * 6/2006 Gass .................... B23D 59/001
83/477.1
(Continued)

FOREIGN PATENT DOCUMENTS

DE 102014206278 A1 10/2015
DE 102014223374 A1 5/2016
(Continued)

OTHER PUBLICATIONS

International Search Report in corresponding PCT/EP2017/068648, dated Feb. 19, 2018.
(Continued)

*Primary Examiner* — Nhat Chieu Q Do
(74) *Attorney, Agent, or Firm* — Hamre, Schumann, Mueller & Larson, P.C.

(57) ABSTRACT

A power tool with a rotatable tool designed as a saw blade or a milling cutter. The power tool includes a sensor device for detecting a mechanical quantity, the mechanical quantity including a force, an acceleration, a velocity, a deflection, a deformation and/or a mechanical stress. The mechanical quantity is dependent on a force emanating from the tool, and a control device communicatively coupled to the sensor device. The control device is adapted to recognize a kickback event based on the detected mechanical quantity, in which the control device is adapted to selectively determine a first recognition function or a second recognition function different from the first recognition function based on a function determination information, and to perform the recognition of the kickback event based on the detected mechanical quantity using the determined recognition function.

19 Claims, 3 Drawing Sheets

(58) Field of Classification Search
USPC .......................................................... 83/62.1
See application file for complete search history.

(56) References Cited

U.S. PATENT DOCUMENTS

| | | | | |
|---|---|---|---|---|
| 8,919,231 | B2* | 12/2014 | Butler | B23D 45/067 83/58 |
| 9,586,336 | B2* | 3/2017 | Mehta | B27G 19/02 |
| 10,144,148 | B2* | 12/2018 | Laghate | B27G 19/02 |
| 2006/0081386 | A1 | 4/2006 | Zhang et al. | |
| 2009/0065225 | A1* | 3/2009 | Forster | B25F 5/00 173/2 |
| 2010/0140345 | A1 | 6/2010 | Sakamoto et al. | |
| 2010/0152882 | A1 | 6/2010 | Krapf et al. | |
| 2011/0226105 | A1 | 9/2011 | Butler et al. | |
| 2012/0289377 | A1 | 11/2012 | Aoki | |
| 2014/0166323 | A1 | 6/2014 | Cooper | |
| 2016/0263674 | A1 | 9/2016 | Laliberte et al. | |
| 2016/0342142 | A1 | 11/2016 | Boeck et al. | |
| 2017/0106520 | A1 | 4/2017 | Schadow et al. | |

FOREIGN PATENT DOCUMENTS

| | | |
|---|---|---|
| EP | 1815931 A1 | 8/2007 |
| EP | 2218533 A1 | 8/2010 |
| JP | 01-177911 | 7/1989 |
| JP | 2003-527255 | 9/2003 |
| JP | 2006-224208 | 8/2006 |
| JP | 2008-516789 | 5/2008 |
| JP | 2010-503096 | 1/2010 |
| JP | 2011-101920 | 5/2011 |
| JP | 2017-509493 | 4/2017 |
| WO | 0126064 A2 | 4/2001 |
| WO | 2009032314 A1 | 3/2009 |
| WO | 2010059786 A1 | 5/2010 |
| WO | 2014105935 A1 | 7/2014 |

OTHER PUBLICATIONS

Written Opinion in corresponding PCT/EP2017/068648, dated Feb. 19, 2018.
Office Action issued in Japanese Patent Application No. 2020-503708, dated Jul. 1, 2021, 18 pages w/translation.
Office action issued in co-pending U.S. Appl. No. 17/487,749, dated Aug. 29, 2022, 23 pages.
Office action issued in co-pending U.S. Appl. No. 17/487,793, dated Aug. 29, 2022, 22 pages.

* cited by examiner

POWER TOOL, SYSTEM, AND METHOD

The invention relates to a power tool with a rotatable tool designed as a saw blade or a milling cutter, a sensor device for detecting a mechanical quantity, the mechanical quantity comprising a force, an acceleration, a velocity, a deflection, a deformation and/or a mechanical stress and the mechanical quantity depending on a force emanating from the saw blade, and a control device communicatively coupled to the sensor device, which control device is adapted to recognize a kickback event of the power tool based on the detected mechanical quantity.

BACKGROUND OF THE INVENTION

The term "kickback event" refers in particular to an event in which, during machining of a workpiece by the power tool, a sudden and unexpected force occurs between the power tool and the workpiece, which then accelerates and sets the power tool or the workpiece in motion. With circular table saws, a kickback usually leads to an unexpected acceleration of the workpiece in the direction of the user. With circular hand saws, a kickback can cause unexpected movements of the tool. Kickbacks can lead to injuries to the user and therefore represent an impairment of the operational safety. A kickback event can occur in particular if the tool is plunged jerkily and too quickly into the workpiece, if the tool is sawing backwards, if the tool is jammed in the workpiece, if specific workpiece properties (e.g. inhomogeneous wood, stresses) are present and/or if the tool is blunt.

WO 2014/105935 A1 describes a table saw with a kickback detection system comprising a sensor adapted to detect a deflection of a shaft as a scalar quantity. A controller compares the detected deflection with a scalar threshold value to determine whether a kickback is present.

SUMMARY OF THE INVENTION

It is an object of the invention to modify the aforementioned power tool in such a way that the usability of the power tool is improved.

The object is solved by a power tool according to claim 1. In accordance with the invention, the control device is adapted to selectively determine, based on a function determination information, a first recognition function or a second recognition function different from the first recognition function and to perform the recognition of the kickback event based on the detected mechanical quantity using the determined recognition function.

The control device is therefore able to determine one of at least two different recognition functions for recognizing the kickback event. The control device therefore has various recognition functions available for use. The control device determines one of these recognition functions and uses the determined recognition function to perform the recognition of the kickback event.

Since the control device has various recognition functions available to use and one of the recognition functions is determined based on the function determination information, it becomes possible to use, with respect to a current operating state and/or environmental state, the optimum recognition function. For example, the function determination information (and thus the recognition function to be used) can be provided based on which user is using the power tool, what tool is being used and/or what workpiece is to be machined.

For example, if the current user is a particularly inexperienced user, a particularly sensitive recognition function can be determined to ensure that weak kickbacks are also recognized by the control device. For a particularly experienced user, on the other hand, it is advisable to determine a particularly insensitive recognition function so that only particularly strong kickbacks are recognized and unnecessary interruption of the machining is avoided.

Thus, by the selective determination of a recognition function from at least two different recognition functions, the usability of the power tool can be improved.

Expediently, the control device is adapted to use only one recognition function, namely the previously determined recognition function, to detect the kickback event. This means that the control device is preferably adapted to use either the first or the second recognition function to detect the kickback event.

Advantageous embodiments are defined in the dependent claims.

The invention further relates to a system comprising the power tool discussed above and an external device, in particular a server. The power tool is adapted to transmit operating information and/or environmental information and/or user identification information to the external device. The external device is adapted to provide function determination information based on the operating information and/or environment information and/or user identification information and to transmit the function determination information to the power tool.

The invention further relates to a method for recognizing a kickback event of a power tool with a rotatable tool in the form of a saw blade or a milling cutter. The method comprises the steps of: detecting a mechanical quantity, wherein the mechanical quantity comprises a force, an acceleration, a velocity, a deflection, a deformation and/or a mechanical stress, and the mechanical quantity depends on a force emanating from the tool; determining, based on a function determination information, a recognition function to be used from a first recognition function and a second recognition function different from the first recognition function; and recognizing, using the determined recognition function, the kickback event based on the detected mechanical quantity.

Expediently, the method is performed with a power tool described here.

BRIEF DESCRIPTION OF THE DRAWINGS

Further exemplary details as well as exemplary embodiments are explained below with reference to the drawing. Thereby shows FIG. 1 a schematic illustration of a power tool, FIG. 2 a diagram illustrating a kickback detection based on a direction of a mechanical vector quantity, FIG. 3 a sectional view of a power tool, FIG. 4 a sectional view of an output shaft and two bearings of the power tool, FIG. 5 a schematic illustration of a power tool, and FIG. 6 a block diagram of a method.

DETAILED DESCRIPTION OF THE INVENTION

Figure 1:
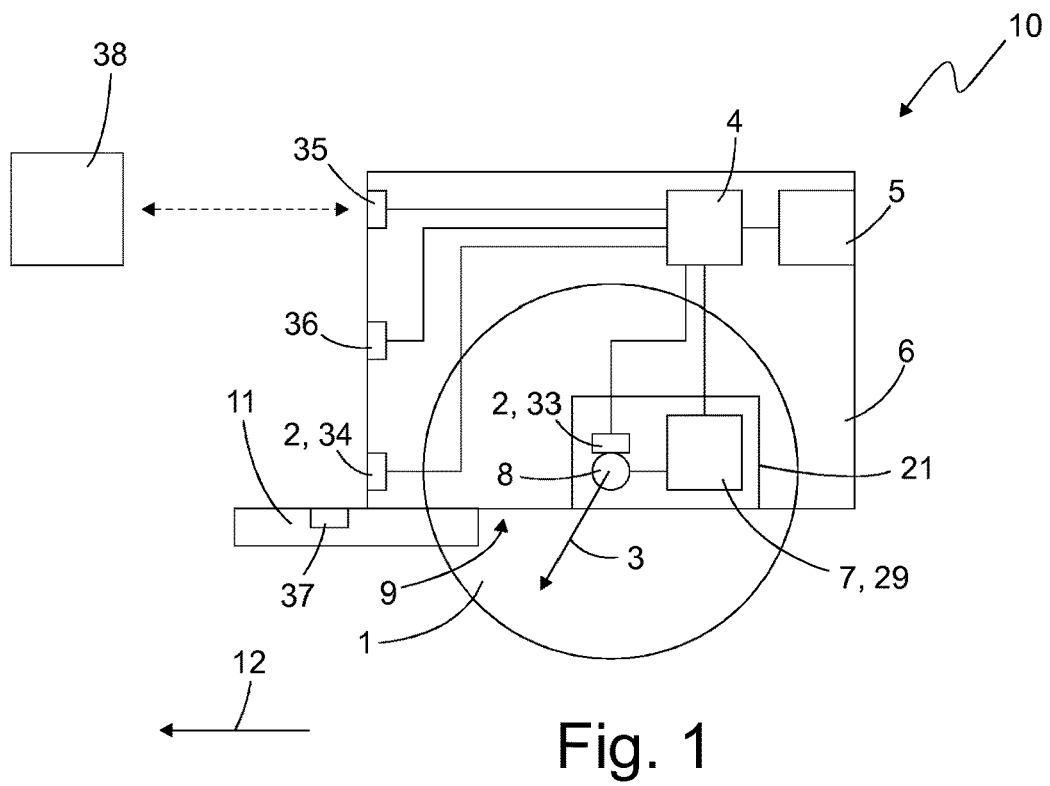

FIG. 1 shows a power tool 10 according to a first embodiment.

The power tool 10 has a rotatable tool 1, which is exemplarily designed as a saw blade. Alternatively, the tool 1 can also be designed as a milling cutter. The power tool 10 comprises a sensor device 2 for detecting a mechanical quantity 3. The mechanical quantity 3 comprises a force, an acceleration, a velocity, a deflection, a deformation and/or a mechanical stress. The mechanical quantity 3 depends on a force emanating from the tool 1. The power tool further has a control device 4 which is communicatively coupled to the sensor unit 2. The control device 4 is adapted to recognize a kickback event based on the detected mechanical quantity 3.

The control device 4 is adapted to determine, based on a function determination information, selectivey a first recognition function or a second recognition function different from the first recognition function. The control device 4 is further adapted to perform the kickback event recognition based on the detected mechanical quantity using the determined recognition function.

Since the control device 4 can determine a recognition function from several available recognition functions and can use it to recognize the kickback event, it becomes possible to use a recognition function that is most suitable for a current state and to thus improve the usability of the power tool 10.

In the following, exemplary details of the power tool 10 as well as other exemplary embodiments are explained.

The power tool 10 is preferably a saw, in particular a hand-held circular saw or a plunge saw. The power tool 10 can also be designed as a flat dowel milling machine. The tool 1 is in particular circular and rotates clockwise in operation, for example.

Exemplarily, the power tool 10 has a housing 6, in which in particular the sensor device 2 and the control device 4 are arranged. The control device 4 is designed as a microcontroller, for example. A contact surface 9 is provided on the housing 6, with which contact surface the power tool 10 can be placed on a workpiece 11 to be machined.

The power tool 10 has a drive device 7, which includes, for example, an electric motor and a gearbox. The drive device 7 is preferably controlled by the control device 4. The power tool 10 further has an output shaft 8, which can be driven by the drive device 7. The tool 1 is mechanically coupled to the output shaft 8. Expediently, the tool 1 is attached to the output shaft 8.

As shown in FIG. 1, when machining the workpiece 11, the power tool 10 typically lies on the workpiece 11 with the contact surface 9 and is moved in a feed direction 12 relative to workpiece 11. Exemplarily, the saw teeth of the tool 1, which is designed as a saw blade, saw into the workpiece 11 from bottom to top. In this constellation, the tool 1 urges relative to the rest of the power tool 10 in the direction of the mechanical quantity 3, i.e. diagonally downwards. The force emanating from the saw blade 1 points in particular in the direction of the mechanical quantity 3.

The power tool 10 further has a support structure 21, which is expediently located in the housing 6. The output shaft 8, for example, is mounted on the support structure 21. Furthermore, the support structure 21 can be designed as a housing for the drive device 7. The support structure 21 may, for example, represent or comprise a drive housing, in particular a gearbox housing.

Exemplarily, the power tool 10 also has a user input device 5. Via the user input device, the user can make a user input, for example for switching the power tool 10 on and off and/or for configuring and/or calibrating the power tool 10.

Furthermore, the power tool 10 exemplarily has a communication interface 35. The communication interface 35 serves for communication with an external device 38, in particular an external server and/or a mobile device. The communication interface 35 is in particular adapted for wireless and/or wired communication. For example, the communication interface 35 is adapted to communicate via Ethernet, WLAN, Bluetooth and/or NFC.

The power tool 10 exemplarily further comprises a user identification device 36. The user identification device 36 is adapted to detect a user identification information, preferably a property, in particular a biometric property, of a user in order to enable an identification of the user, for example by the control device 4. For example, the user identification device 36 has a fingerprint scanner and/or an image sensor.

Exemplarily, the sensor device 2 has two sensor units 33, 34. The already mentioned detection of the mechanical quantity 3 is exemplarily carried out by the first sensor unit 33. In FIG. 1, the sensor device 2 or the first sensor unit 33 is exemplarily coupled to the output shaft 8 and is adapted to detect the mechanical quantity 3—namely a force, acceleration, velocity, deflection, deformation and/or mechanical stress—of the output shaft 8. Expediently, the mechanical quantity 3 is a vector quantity. Preferably, the sensor device 2 is adapted to continuously detect the mechanical quantity 3, so that a change, especially a change in direction of the mechanical quantity 3 can be detected.

The sensor device 2 is preferably further adapted to detect operating information and/or environmental information. For this purpose, the sensor device 2 in FIG. 1 optionally has the second sensor unit 34. Alternatively or additionally, it is also possible to use the first sensor unit 33 to acquire operational and/or environmental information.

The operational and/or environmental information is, for example, a property of the tool 1, for example the type and/or a wear state of the tool 1.

For example, the sensor device 2 may include, as the second sensor unit 34, an image sensor capable of taking an image of the tool 1, in particular of a marking applied to the tool 1, such as a type designation. Based on the captured image, the control device 4 can then determine the type of the tool 1.

For determining a wear state of the tool 1, the control device 4 can, for example, be adapted to detect the mechanical quantity 3 as a mechanical vector quantity and to infer the wear state if a specific direction and/or change of direction of the mechanical vector quantity is given. As an alternative or in addition to this, the control device 4 can be adapted to repeatedly detect the mechanical quantity 3 over a longer period of time or a plurality of uses of the power tool 10 and to carry out a statistical evaluation of the detections, from which it is then possible to draw conclusions about the wear state, for example on the basis of a trend or a development or a deviation of an average value.

In addition, as operating information and/or environmental information, a property of the workpiece 11 to be machined with the tool 1 can be detected. For example, an image of the workpiece 11, in particular a marking 37 applied to workpiece 11, for example a type designation, can be taken. Based on the captured image, the control device 4 can then determine the type of the workpiece 11.

Furthermore, the detected operational and/or environmental information may include a temperature and/or humidity. For example, the sensor device 2 may, as the second sensor unit 34, include a temperature sensor and/or a humidity sensor.

In the example shown, the second sensor unit 34 and the user identification device 36 are two different units. Alternatively, especially when both the sensor unit 34 and the user identification device 36 are used to take an image, the sensor unit 34 and the user identification device 36 may be the same unit.

The two recognition functions and in particular the difference between the recognition functions are explained in detail below.

In the simplest case, the recognition functions can each be a comparison of the mechanical quantity 3 with a respective threshold, the comparison being carried out by control device 4. For example, the mechanical quantity 3 is detected as a scalar and is compared with a respective scalar threshold. Alternatively or in addition to this, the mechanical quantity 3 can also be detected as a vector quantity and the magnitude of the vector quantity can be compared with a respective threshold. If the threshold is exceeded, the control device 4 infers a kickback event.

s Expediently, each recognition function is associated with a different threshold. For example, the threshold of the first recognition function is greater than the threshold of the second recognition function.

Preferably, the second recognition function is more sensitive than the first recognition function. This means that when using the second recognition function, a larger value range of the detected mechanical quantity 3 leads to the recognition of a kickback event than with the first recognition function.

The second recognition function is therefore, for example, more suitable for less experienced users of the power tool, since the second recognition function recognizes a wider range of kickbacks—especially also weaker kickbacks. The first recognition function, on the other hand, is, for example, more suitable for trained or very experienced users of the power tool 10 who can handle weaker kickbacks even without the assistance of the power tool 10. Since the first recognition function does not detect or ignores weaker kickbacks, the use of the first recognition function can prevent, for a trained or very experienced user, the kickback recognition from causing unnecessary and interfering interruptions of the machining process.

As mentioned above, the mechanical quantity 3 is preferably detected as a vector quantity. In this case, the kickback event can in particular be detected based on a direction and/or a change in direction of the vector quantity. For example, the control device 4 is adapted to determine whether the direction of a mechanical quantity 3, detected as a vector quantity, lies within or outside a specific directional range and to decide based on this determination whether or not the kickback event is present.

Figure 2:
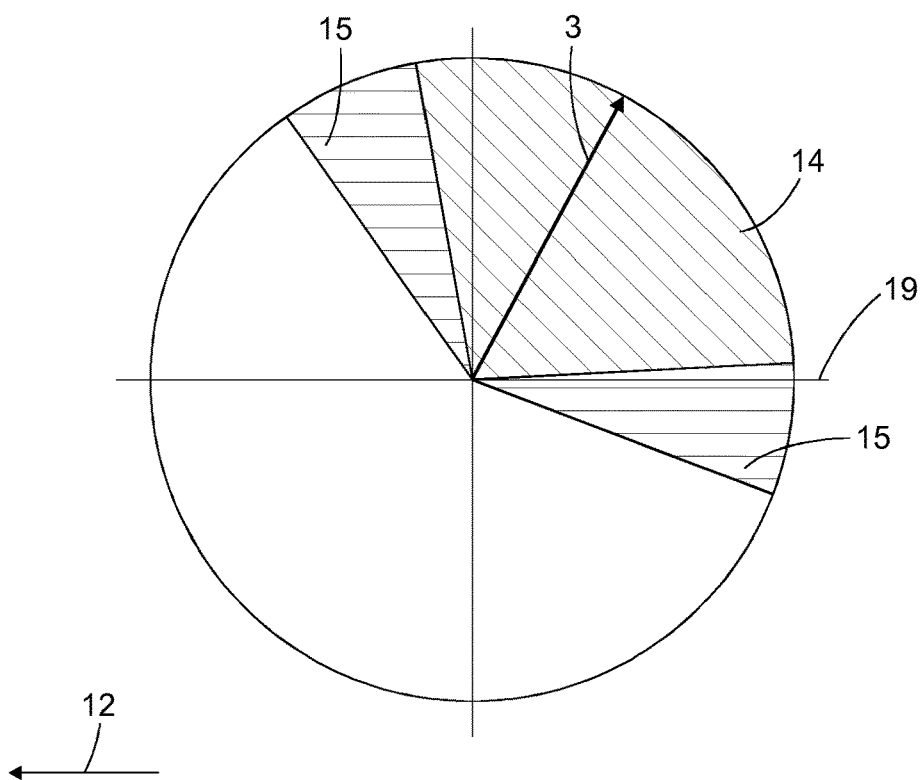

With reference to FIG. 2, a recognition of the kickback event based on a vector quantity is explained below.

FIG. 2 shows a diagram with different directional ranges 14, 15 and the detected mechanical quantity 3.

The diagram is divided into four quadrants. Each quadrant covers 90 degrees. The reference sign 19 indicates the zero degree line. The angle coordinates or degrees mentioned below are to be understood in the mathematically positive direction of rotation (counter-clockwise). Expediently, the zero degree line runs parallel to the contact surface 9 and/or to the feed direction 12.

The directional ranges 14, 15 are exemplarily two-dimensional directional ranges. The directional ranges 14, 15 can also be called angular ranges. Expediently, the directional ranges 14, 15 lie in a plane. The plane is expediently aligned parallel to the plane of the tool 1 or perpendicular to the axial direction of the output shaft 8.

The two directional ranges 14, 15 differ from each other. As an example, the first directional range 14 is within the second directional range 15. The first directional range is expediently smaller than the second directional range 15. Expediently, the first directional range 14 belongs to the first recognition function. The first recognition function includes in particular a comparison of a direction of the mechanical vector quantity with the first directional range 14. The second directional range 15 expediently belongs to the second recognition function. The second recognition function includes in particular a comparison of the direction of the mechanical vector quantity with the second directional range 15.

The control device 4 is expediently adapted to provide the first directional range 14 and the second directional range 15. For example, both directional ranges are stored in a memory in the control device 4. Alternatively or in addition to this, the control device 4 can also be adapted to generate the directional ranges 14, 15 itself.

The first directional range 14 represents a directional range in which the mechanical vector quantity is located if, with very high probability, a kickback is present or is imminent. As an example, the first directional range 14 is located in the two upper quadrants, i.e. within a range between 0 degrees and 180 degrees. In the example shown, the first directional range 14 extends from 5 degrees to 100 degrees. If the control device 4 uses the first recognition function, the kickback event is recognized if the mechanical vector quantity 3 lies within the first directional range 14.

The second directional range 15 is larger than the first directional range 14. As an example, the second directional range 15 is located in the first, second and fourth quadrants, i.e. within a range between 270 degrees (or −90 degrees) and 180 degrees. In the example shown, the second directional range 15 extends from 340 degrees (or −20 degrees) to 120 degrees. The second directional range 15 covers not only directions in which a kickback can be inferred with a very high probability, but also directions in which a kickback is still possible but less likely than in the first directional range 14. In particular, the second directional range 15 also includes directions in which the cause or an initial indicator of the kickback is already given, but the power tool 10 or the workpiece 11 have not yet been significantly accelerated or have not yet exerted any recoil. Expediently, the control device may be adapted to detect, when using the second directional range 15, the kickback event 50 to 100 ms before an acceleration of the power tool 10 relative to workpiece 11 would take place (without a recognition and a response to the kickback). The acceleration is, for example, an acceleration with one component upwards or one component in a 90 degree direction in the diagram shown.

Expediently, the control device is adapted to recognize that there is no kickback event if the mechanical quantity 3 is outside the first directional range 14 or outside the second directional range 15.

As an alternative or in addition to the recognition of the kickback event based on the direction of the detected mechanical vector quantity described above, it is also possible to perform the recognition of the kickback event based on a change in direction of the mechanical vector quantity.

Accordingly, the first and second recognition functions may include a comparison of a change of direction, in particular an angular velocity and/or angle of change, of the mechanical vector quantity with a respective directional change threshold.

If a kickback is imminent, the mechanical vector quantity rotates in the direction towards the first directional range 14 The recognition functions can accordingly take into account a detected rotation of the mechanical vector quantity when recognizing the kickback event. For example, the control device 4 is adapted to compare the angular velocity of the mechanical vector quantity with a velocity threshold and to recognize the kickback event if the velocity threshold is exceeded. For the first recognition function, a different, in particular a higher velocity threshold can be used than for the second recognition function.

Furthermore, the control device 4 may be adapted to determine the angle of change by which the mechanical vector quantity 3 has changed, in particular within a specific time window, and to compare this angle of change with an angle threshold in order to recognize the kickback event. For the first recognition function, a different, in particular a larger angular threshold can be used than for the second recognition function.

In addition, the recognition functions can take into account the time duration that the mechanical vector quantity 3 is within a specific directional range 14, 15. For example, the control device 4 may be adapted to recognize the kickback event only if the mechanical vector quantity is within a specific directional range 14, 15 for longer than a specific time threshold. For the first recognition function, a different, in particular a larger time threshold value can be used than for the second recognition function.

The above explained specific angle figures of the directional ranges 14, 15 are to be understood purely as examples. Actual angles may vary depending on the type and construction of the power tool 10. The actual angles of the directional ranges 14, 15 can be determined by calibration. Calibration can be carried out, for example, during the development or manufacture of the power tool and/or by the user.

Expediently, the control device 4 is adapted to calibrate one or more directional ranges 14, 15. For example, the calibration can be initiated via the user interface 5. The control device 4 can then drive the tool 1 via the drive device 7 and, while doing so, detect the mechanical vector quantity 3 via the sensor device 2. Based on the detected mechanical vector quantity 3, the control device 4 can then create a directional range and/or one or more thresholds and store them in a memory of the control device 2.

In the following, it is explained by way of example how the recognition function to be used can be determined.

Basically, the control device 4 determines the recognition function to be used based on the function determination information. The function determination information is either provided externally to the control device 4 or is created in the control device 4.

For example, the function determination information can be entered via the user input device 5. As an example, a user can choose, via the user input device 5, between two different safety profiles—e.g. a beginner profile and a professional profile. According to the user's input or choice, the control device 4 then uses either the first recognition function or the second recognition function.

Further, the control device 4 can receive the function determination information via the communication interface 35. For example, the control device 4 can communicate via the communication interface with an external device 3, such as a server or a mobile device, and receive the function determination information from this external device 3. According to the received function determination information, the controller then uses either the first recognition function or the second recognition function.

As an example, the function determination information can also be provided in the control device 4. For example, the control device 4 is adapted to identify a user by means of the user identification device 36 and provide the function determination information according to the identification. For example, an assignment between different users and the recognition functions can be stored in the control device 4, so that when the user is identified, the assigned recognition function can be selected and used.

As an example, the control device is further adapted to provide the function determination information based on an operating information and/or environmental information detected by the sensor device 2, in particular the second sensor unit 34. For example, the control device 4 can use the sensor device 2 to detect a state of the tool, workpiece and/or environment and determine the recognition function to be used based on this.

It is also possible that the control device 4 cooperates with the external device 38, in particular the server or mobile device, via the communication interface 35 to identify the user and/or to provide the function determination information. In this case, the power tool 10 and the external device 38 can together form a system. For example, the power tool 10 is adapted to transmit operating information and/or environmental information and/or user identification information to the external device 38. The external device 38 is expediently adapted to provide and transmit the function determination information to the power tool based on the operating information and/or environmental information and/or the user identification information.

For example, as the user identification information, information recorded with the user identification device, such as biometric information, can be transmitted to the external device 38. In the external device 38, a user identity and/or function determination information can then be determined, for example by referring to a database stored there. The user identity and/or function determination information can then be transmitted via the communication interface 35 to the control device 4 for further use.

In the above discussion, two recognition functions are always mentioned. Of course, the control device 4 can also have more than two different recognition functions available for recognizing the kickback event.

For example, the recognition functions available to the control device 4 may be stored in a memory of control device 4. According to the function determination information, the control device 4 then selects a recognition function and uses it to detect a kickback event. In this case, the function determination information can include, for example, the information which recognition function is to be used.

Alternatively, or in addition thereto, the control device 4 may create, by itself, a recognition function to be used, the creation being expediently based on the function determination information. For example, the function determination information may specify a parameter to be used for the recognition function, such as a threshold, and/or a mathematical operator to be used.

Below, exemplary possibilities are explained how the mechanical quantity 3 can be detected as a vector quantity.

The sensor device 2 is expediently adapted to detect the mechanical vector quantity 3 as an at least two-dimensional vector. For this purpose, the sensor device 2 is adapted to measure the mechanical quantity underlying the mechanical vector quantity 3 in at least two different spatial directions. The two spatial directions are, for example, a spatial direction parallel to the feed direction 12 and a spatial direction perpendicular to the feed direction 12. Expediently, both spatial directions are perpendicular to the axial direction of the output shaft 8. For example, the sensor device 2 has at least two sensor elements 25, 26. Expediently, each of the sensor elements 25, 26 serves to measure the underlying mechanical quantity—i.e. a force, an acceleration, a velocity, a deflection, a deformation and/or a mechanical stress—in a different spatial direction.

The mechanical vector quantity 3 is in particular a force vector, an acceleration vector, a velocity vector, a deflection vector, a deformation vector and/or a mechanical stress vector or stress tensor. Accordingly, the sensor device 2 can be adapted to measure, in at least two spatial directions, a force, an acceleration, a velocity, a deflection, a deformation and/or a mechanical stress.

The sensor device 2 may in particular comprise a radial measuring bearing 28, with which, for example, the output shaft 8 is mounted. The radial measuring bearing 28 can be adapted to measure, by means of force sensors or stress sensors, for example piezoresistive sensors, the force between the output shaft 8 and the measuring bearing 28 as the mechanical vector quantity 3.

Alternatively or in addition thereto, the sensor device 2 may comprise distance sensors spaced from the output shaft 8 and adapted to detect the deflection of the output shaft 8 as the mechanical vector quantity 3.

Further, the sensor device 2 may include stress sensors, such as strain gauges (SG), in particular attached to the support structure 21.

Basically, the sensor device 2 can be set up to measure the mechanical vector quantity 3 at a part within the force flow emanating from the tool 1. The force flow runs exemplarily from the tool 1 via the output shaft 8, a bearing device 27, the support structure 21, the housing 6 and the contact surface 9 to the workpiece 11. In particular, the sensor device 2 is adapted to measure the mechanical vector quantity 3 between two parts lying one behind the other in the force flow.

Figure 3:
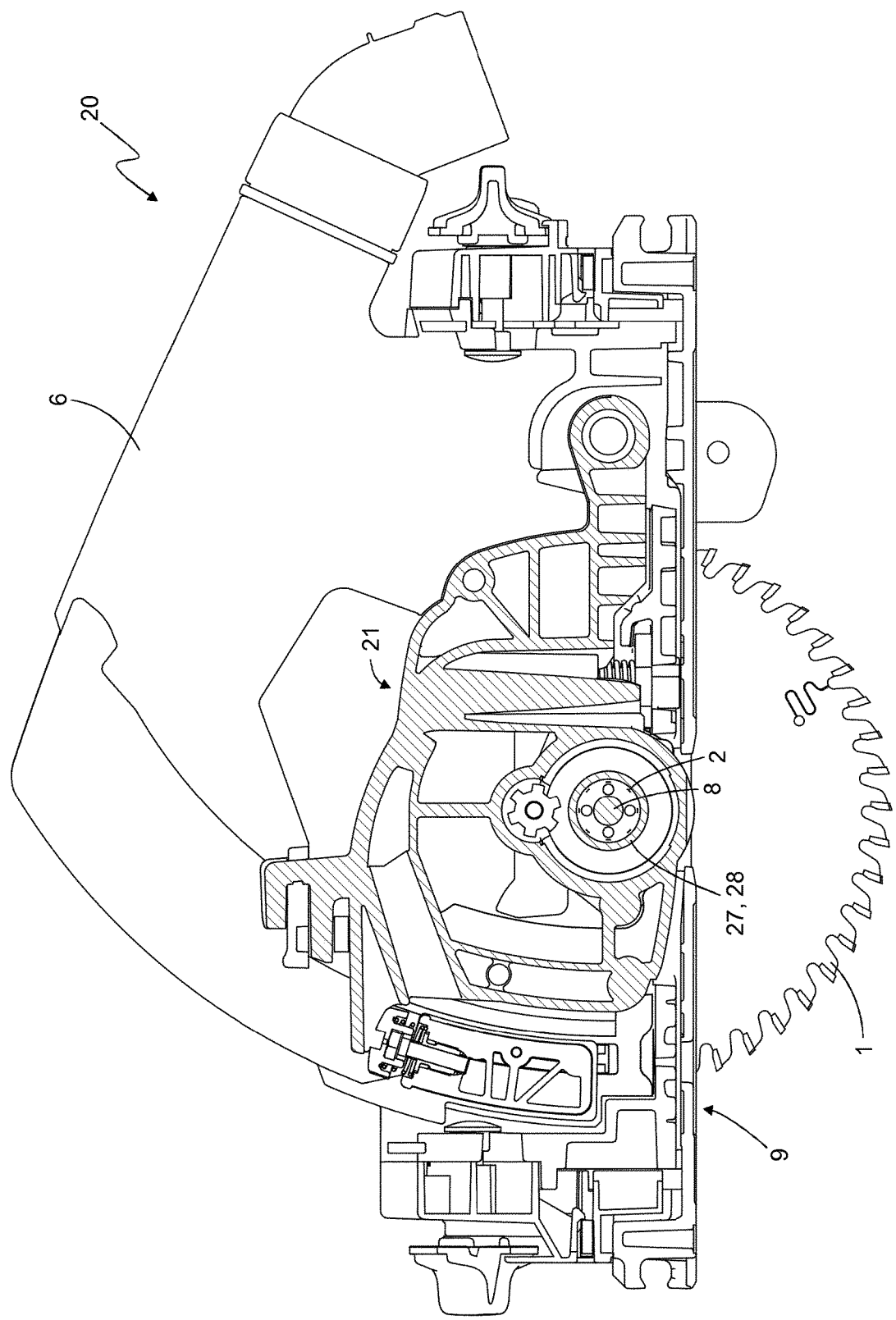

FIG. 3 shows a sectional view of the power tool 20. The above explanations related to the power tool 10 also apply to the power tool 20.

As shown in FIG. 3, the power tool 20 comprises a bearing device 27, which is provided on the support structure 21 and mounts the output shaft 8 relative to the support structure 21. The bearing device 27 expediently comprises one or more bearings 31, 32, in particular radial and/or radiaxial bearings, preferably ball bearings.

Expediently, at least one bearing 31, 32 of the bearing device 27 is designed as a measuring bearing 28, in particular as a radial measuring bearing, and can therefore serve as the sensor device 2. The measuring bearing 28 is preferably adapted to measure a force present between the output shaft 8 and the support structure 21 in at least two different spatial directions. For example, the measuring bearing 28 has a plurality of sensor elements, for example piezoresistive sensor elements, in particular piezoresistive thin-film sensor elements, which are expediently arranged in a circumferential direction around the output shaft 8. In particular, the sensor elements are arranged on an outer bearing component of the measuring bearing 28—i.e. a bearing component that is stationary relative to the support structure 21 or a bearing component that does not rotate with the output shaft 8, such as an outer ring. As an example, eight sensor elements are provided, which are offset by 45 degrees to each other.

Figure 4:
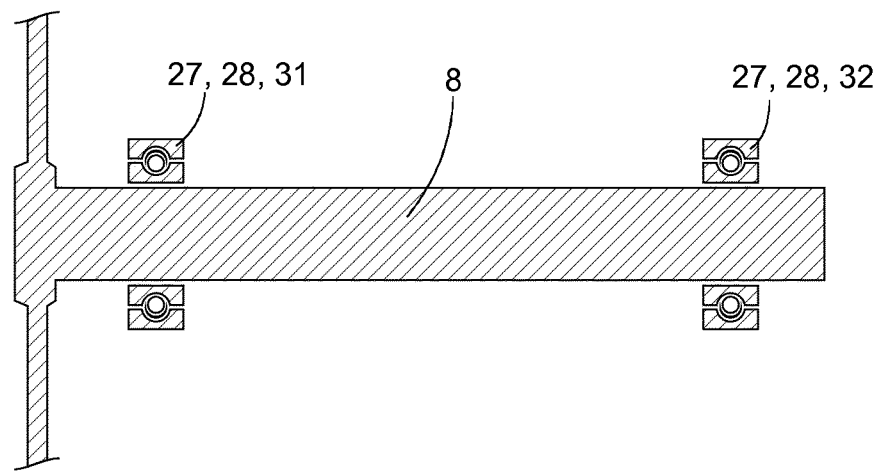

FIG. 4 shows the output shaft 8 together with two bearings 31, 32 of the bearing device 27. Exemplarily, the first bearing 31 is located in the area of a distal end of the output shaft 8, the distal end being assigned to the tool 1, and the second bearing 32 is located in the area of a distal end of the output shaft 8, the distal end facing away from the tool 1.

Expediently, one or both bearings 1, 2 is/are designed as the measuring bearing 28 explained above.

As an alternative or in addition to the embodiment explained above, where the sensor device 2 is internally integrated in one or more bearings 31, 32, the sensor device 2 may also be located between one or more bearings 31, 32 and the support structure 21.

Figure 5:
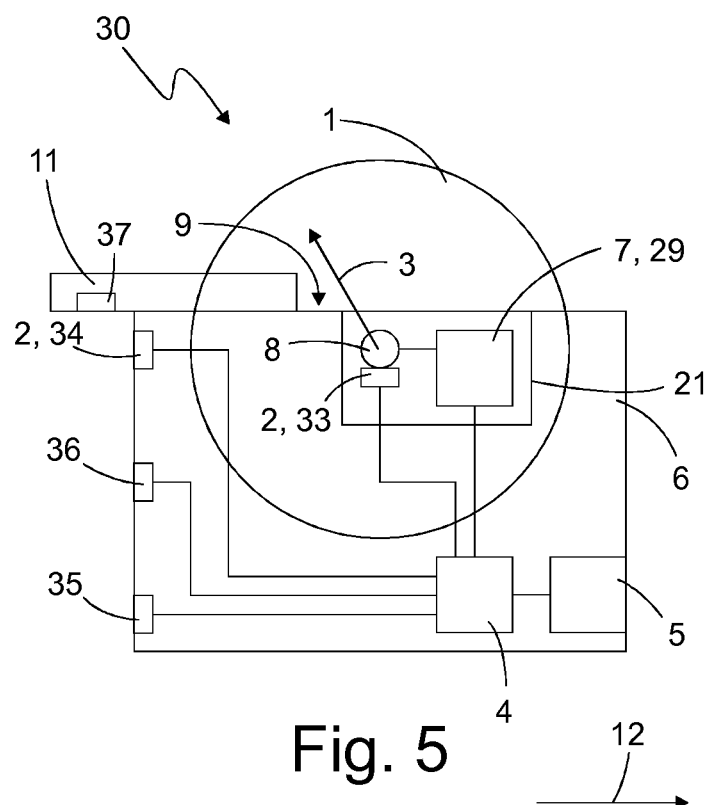

FIG. 5 shows a power tool 30 according to a sixth embodiment. The power tool 30 is here exemplarily designed as a stationary saw, in particular as a circular table saw. The power tool 30 expediently includes the features already discussed above in connection with the power tool 10 and/or the power tool 20.

As an example, the tool 1 here rotates counterclockwise. Expediently, the workpiece 11 is pushed into the tool 1, which is designed as a saw blade, so that the saw teeth saw into the workpiece 11 from top to bottom. FIG. 8 shows a corresponding feed direction 12. The directional ranges 14, 15 are adapted accordingly for the power tool 60. For example, the directional ranges 14, 15 shown in FIG. 2 can be point-mirrored around the center of the diagram.

In the following, different possibilities are discussed how to react to a detected kickback event. Expediently, each of these possibilities is present for each of the power tools discussed above.

Preferably, the control device 4 may be adapted to perform a specific control of the drive device 7 in response to the detected kickback event, for example to cause that the tool 1 is no longer being driven and/or is braked, in particular braked completely. In particular, braking can be carried out with the same electric motor that is otherwise used to drive the tool 1. Alternatively or in addition thereto, the drive device 7 may include a braking means and the control device 4 may be adapted to control the braking means in response to the detected kickback event so that the tool 1 is braked.

Furthermore, the power tool 10, 30 may include a positioning device 29 adapted to position the tool 1 either in an operating position or in a safety position. The control device 4 can be adapted to control the positioning device 29 in response to the detected kickback event so that the tool 1 is positioned in the safety position. The positioning device 29 is adapted, for example, to move and/or swivel the tool 1 between the operating position and the safety position. Expediently, the tool 1 is positioned, in the safety position, further into the housing 6 than in the operating position.

Figure 6:
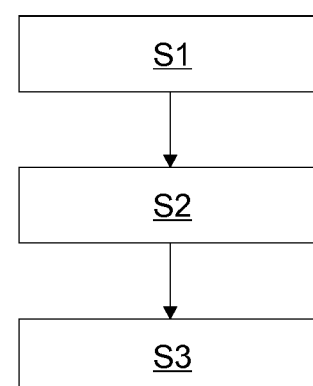

FIG. 6 shows a flow chart of a method for recognizing a kickback event of a power tool with a rotatable tool designed as a saw blade or a milling cutter. The method comprises the steps of: detecting, S1, a mechanical quantity 3, wherein the mechanical quantity 3 comprises a force, an acceleration, a velocity, a deflection, a deformation and/or a mechanical stress, and the mechanical quantity 3 depends on a force emanating from the tool 1, determining, S2, based on a function determination information, a recognition function to be used from a first recognition function and a second recognition function different from the first recognition function, and recognizing, S3, using the determined recognition function, the kickback event based on the detected mechanical quantity 3.

Expediently, one of the power tools 10; 20; 30 described above is used for carrying out the method.

Preferably, the method has a further step in which one of the reactions discussed above is executed in response to the detected kickback event.

The invention claimed is:

1. A power tool with a rotatable tool, wherein the rotatable tool is designed as a saw blade or a milling cutter, wherein the power tool comprises:
   a sensor device for detecting a mechanical vector quantity, wherein the mechanical vector quantity is a force vector, an acceleration vector, a velocity vector, a deflection vector, a deformation vector, a mechanical stress vector or a stress tensor, and the mechanical vector quantity is dependent on a force emanating from the rotatable tool that is designed as the saw blade or the milling cutter, and
   a control device communicatively coupled to the sensor device, which control device is adapted to recognize a kickback event based on the detected mechanical vector quantity,
   wherein the control device is adapted to selectively determine, based on a function determination information, a first recognition function or a second recognition function different from the first recognition function, and to perform the recognition of the kickback event based on the detected mechanical vector quantity using the determined recognition function,
   wherein the sensor device is adapted to detect the mechanical vector quantity as an at least two-dimensional vector, and, for this purpose, is adapted to measure a mechanical quantity underlying the mechanical vector quantity in at least two different spatial directions,
   wherein the first recognition function includes a comparison of a direction of the mechanical vector quantity with a first two-dimensional angular range and the second recognition function includes a comparison of the direction of the mechanical vector quantity with a second two-dimensional angular range different from the first angular range, and
   an output shaft to which the tool is attached, wherein the mechanical vector quantity lies in a plane perpendicular to an axial direction of the output shaft.

2. The power tool according to claim 1, wherein the first and second recognition functions differ in their sensitivity.

3. The power tool according to claim 1, wherein the first recognition function comprises a comparison of the detected mechanical vector quantity with a first threshold and the second recognition function comprises a comparison of the detected mechanical vector quantity with a second threshold different from the first threshold.

4. The power tool according to claim 1, wherein the sensor device comprises a measuring bearing for detecting the mechanical vector quantity.

5. The power tool according to claim 1, wherein the power tool comprises a user input device adapted for input of the function determination information by a user.

6. The power tool according to claim 1, wherein the sensor device is adapted to detect operating information and/or environmental information, the control device being adapted to provide the function determination information based on the operating information and/or environmental information.

7. The power tool according to claim 6, wherein the operating information and/or environmental information comprises a property of the tool, a property of a workpiece to be machined with the tool, a temperature and/or an air humidity.

8. The power tool according to claim 1, wherein the control device is adapted to perform a calibration of at least one of the first and second recognition functions.

9. The power tool according to claim 1, wherein the power tool comprises a drive device for driving the rotatable tool and the control device is adapted to control the drive device in response to the detected kickback event in order to change the driving of the rotatable tool.

10. The power tool according to claim 9, wherein the control device is adapted to control the drive device in response to the detected kickback event in order to brake the rotatable tool.

11. The power tool according to claim 1, wherein the change of direction comprises an angular velocity of the mechanical vector quantity and/or a change angle of the mechanical vector quantity.

12. The power tool of claim 1, wherein the first angular range is smaller than the second angular range.

13. The power tool of claim 12, wherein the first angular range is within the second angular range.

14. The power tool of claim 1, wherein the control device comprises a memory and the first angular range and the second angular range are stored in the memory.

15. The power tool of claim 1, further comprising the output shaft to which the tool is attached, wherein the first angular range and the second angular range lie in a plane perpendicular to an axial direction of the output shaft.

16. The power tool of claim 1, wherein the control device is adapted to select, based on the function determination information, either the first recognition function or the second recognition function, and to perform the recognition of the kickback event based on the detected mechanical vector quantity using the selected recognition function.

17. A method for recognizing a kickback event of a power tool with a rotatable tool, wherein the rotatable tool is designed as a saw blade or a milling cutter, the method comprising the steps:
   detecting a mechanical vector quantity, wherein the mechanical vector quantity comprises a force vector, an acceleration vector, a velocity vector, a deflection vector, a deformation vector, or a mechanical stress vector or a stress tensor, and the mechanical vector quantity depends on a force emanating from the rotatable tool that is designed as the saw blade or the milling cutter,
   determining, based on function determination information, a recognition function to be used from a first recognition function and a second recognition function different from the first recognition function, and recognizing, using the determined recognition function, the kickback event based on the detected mechanical vector quantity,
   wherein the mechanical vector quantity is detected as an at least two-dimensional vector, and, for this purpose, a mechanical quantity underlying the mechanical vector quantity is measured in at least two different spatial directions,
   wherein the first recognition function includes a comparison of a direction of the mechanical vector quantity with a first two-dimensional angular range and the second recognition function includes a comparison of the direction of the mechanical vector quantity with a second two-dimensional angular range different from the first angular range, and
   an output shaft to which the tool is attached, wherein the mechanical vector quantity lies in a plane perpendicular to an axial direction of the output shaft.

18. A power tool with a rotatable tool, wherein the rotatable tool is designed as a saw blade or a milling cutter, wherein the power tool comprises:
- a sensor device for detecting a mechanical vector quantity, wherein the mechanical vector quantity is a force vector, an acceleration vector, a velocity vector, a deflection vector, a deformation vector, a mechanical stress vector or a stress tensor, and the mechanical vector quantity is dependent on a force emanating from the rotatable tool that is designed as the saw blade or the milling cutter, and
- a control device communicatively coupled to the sensor device, which control device is adapted to recognize a kickback event based on the detected mechanical vector quantity,
- wherein the control device is adapted to selectively determine, based on a function determination information, a first recognition function or a second recognition function different from the first recognition function, and to perform the recognition of the kickback event based on the detected mechanical vector quantity using the determined recognition function,
- wherein the sensor device is adapted to detect the mechanical vector quantity as an at least two-dimensional vector, and, for this purpose, is adapted to measure a mechanical quantity underlying the mechanical vector quantity in at least two different spatial directions,
- wherein the first recognition function includes a comparison of an angular velocity of the mechanical vector quantity with a first velocity threshold and the second recognition function includes a comparison of an angular velocity of the mechanical vector quantity with a second velocity threshold different from the first velocity threshold, and
- an output shaft to which the tool is attached, wherein the mechanical vector quantity lies in a plane perpendicular to an axial direction of the output shaft.

19. A power tool with a rotatable tool, wherein the rotatable tool is designed as a saw blade or a milling cutter, wherein the power tool comprises:
- a sensor device for detecting a mechanical vector quantity, wherein the mechanical vector quantity is a force vector, an acceleration vector, a velocity vector, a deflection vector, a deformation vector, a mechanical stress vector or a stress tensor, and the mechanical vector quantity is dependent on a force emanating from the rotatable tool that is designed as the saw blade or the milling cutter, and
- a control device communicatively coupled to the sensor device, which control device is adapted to recognize a kickback event based on the detected mechanical vector quantity,
- wherein the control device is adapted to selectively determine, based on a function determination information, a first recognition function or a second recognition function different from the first recognition function, and to perform the recognition of the kickback event based on the detected mechanical vector quantity using the determined recognition function,
- wherein the sensor device is adapted to detect the mechanical vector quantity as an at least two-dimensional vector, and, for this purpose, is adapted to measure a mechanical quantity underlying the mechanical vector quantity in at least two different spatial directions,
- wherein the first recognition function includes a comparison of an angle of change, by which the mechanical vector quantity has changed, with a first angular threshold and the second recognition function includes a comparison of the angle of change with a second angular threshold different from the first angular threshold, and
- an output shaft to which the tool is attached, wherein the mechanical vector quantity lies in a plane perpendicular to an axial direction of the output shaft.

* * * * *